(12) United States Patent
Planque

(10) Patent No.: US 9,574,278 B2
(45) Date of Patent: Feb. 21, 2017

(54) EASILY PRODUCED INTERCONNECTING MODULE FOR A HIGH-TEMPERATURE WATER ELECTROLYSIS DEVICE

(75) Inventor: Michel Planque, Seyssins (FR)

(73) Assignee: Commissariat à l'énergie atomique et aux énergies alternatives, Paris (FR)

(*) Notice: Subject to any disclaimer, the term of this patent is extended or adjusted under 35 U.S.C. 154(b) by 481 days.

(21) Appl. No.: 14/124,275

(22) PCT Filed: Jun. 12, 2012

(86) PCT No.: PCT/EP2012/061131
§ 371 (c)(1),
(2), (4) Date: Dec. 6, 2013

(87) PCT Pub. No.: WO2012/171925
PCT Pub. Date: Dec. 20, 2012

(65) Prior Publication Data
US 2014/0116874 A1    May 1, 2014

(30) Foreign Application Priority Data

Jun. 16, 2011 (FR) ...................... 11 55275

(51) Int. Cl.
*C25B 9/04* (2006.01)
*C25B 9/08* (2006.01)
*C25B 9/18* (2006.01)
*C25B 1/04* (2006.01)

(52) U.S. Cl.
CPC . *C25B 9/04* (2013.01); *C25B 1/04* (2013.01); *C25B 9/08* (2013.01); *C25B 9/18* (2013.01); *Y02E 60/366* (2013.01)

(58) Field of Classification Search
CPC ...... C25B 1/02–1/12; C25B 9/04; C25B 9/08; C25B 9/18; C25B 15/08; H01M 8/02; H01M 8/026; H01M 8/0263; H01M 8/0265; Y02E 60/366
See application file for complete search history.

(56) References Cited

U.S. PATENT DOCUMENTS

| | | |
|---|---|---|
| 4,788,110 A | 11/1988 | Bernard |
| 6,649,297 B1 | 11/2003 | Marchand et al. |
| 8,317,986 B2 | 11/2012 | Le Gallo |
| 8,500,971 B2 | 8/2013 | Le Gallo et al. |
| 2012/0325652 A1 | 12/2012 | Perret |

(Continued)

FOREIGN PATENT DOCUMENTS

| | | |
|---|---|---|
| BE | 1004689 | 1/1993 |
| FR | 2 786 027 | 5/2000 |

(Continued)

OTHER PUBLICATIONS

U.S. Appl. No. 14/433,492, filed Apr. 3, 2015, Manon, et al.
(Continued)

*Primary Examiner* — Ciel Thomas
(74) *Attorney, Agent, or Firm* — Oblon, McClelland, Maier & Neustadt, L.L.P.

(57) ABSTRACT

A fluid interconnecting module for an HTE electrolyzer with a stack of elementary electrolysis cells. The interconnecting module includes plates welded to each other, some of which are partly stamped, some of the plates being perforated to enable high temperature steam $H_2O$ supply to electrolysis cells and collection of the hydrogen $H_2$ and oxygen $O_2$ produced.

11 Claims, 5 Drawing Sheets

(56) References Cited

U.S. PATENT DOCUMENTS

2012/0325654 A1 12/2012 Le Gallo et al.
2012/0325677 A1 12/2012 Le Gallo
2013/0043123 A1 2/2013 Reytier et al.

FOREIGN PATENT DOCUMENTS

| JP | 7-145492 | 6/1995 |
| JP | 2006-228483 | 8/2006 |
| JP | 2007-227317 | 9/2007 |
| WO | WO 2011/110679 A1 | 9/2011 |

OTHER PUBLICATIONS

Preliminary Search Report issued Jan. 11, 2012 in French Application No. 1155275 (With English Translation of Category of Cited Documents).
Li, X., et al., "Review of bipolar plates in PEM fuel cells: Flow-field designs", International Journal of Hydrogen Energy, vol. 30, No. 4, pp. 359-371, (Mar. 1, 2005) XP 027750461.
International Search Report Issued Nov. 7, 2012 in PCT/EP12/061131 Filed Jun. 12, 2012.
Japanese Office Action issued Jun. 27, 2016, for JP2014-515162—English translation provided.

EASILY PRODUCED INTERCONNECTING MODULE FOR A HIGH-TEMPERATURE WATER ELECTROLYSIS DEVICE

TECHNICAL FIELD

This invention relates to a device for high temperature electrolysis (HTE) of water also called a high temperature steam electrolysis (HTSE).

It deals particularly with a simpler construction of fluid and electrical interconnectors of an HTE electrolyser according to patent application PCT/EP2011/053728.

PRIOR ART

A high temperature water (HTE) electrolyser comprises at least one elementary electrochemical cell comprising an electrolyte, a cathode and an anode, the electrolyte being inserted between the anode and the cathode. The electrolyte is gas tight, electronically insulating and is an ionic conductor. The electrodes (anode and cathode) are made of a porous material and are electronic conductors.

An HTE electrolyser also comprises fluid and electrical interconnection devices that are in electrical contact with one or more electrodes. These interconnection devices usually perform functions to supply and to collect electrical current and delimit one or more gas circulation compartments.

Thus, the function of a so-called cathodic compartment is to distribute electrical current and steam and to recover hydrogen at the cathode in contact.

The function of a so-called anodic compartment is to distribute electrical current and recover oxygen produced at the anode in contact. A draining gas may also be injected at an input of the anode compartment to evacuate the oxygen produced. Injection of a draining gas has an additional function which is to act as a temperature regulator.

FIGS. 1, 1A and 1B show a channel plate 1 currently used as an interconnection device. Electrical current is supplied to or collected from the electrode by teeth or ribs 10 that are in direct mechanical contact with the electrode concerned. Steam supplied to the cathode (or draining gas supplied to the anode) is symbolically represented by the arrows in FIG. 1. Hydrogen produced at the cathode (or oxygen produced at the anode) is collected through channels 11 that lead into a fluid connection, commonly called a manifold, common to the stack of cells. The structure of this type of interconnection device is designed to achieve a compromise between the supply and collection functions (gas/current).

The major disadvantages of this channel plate can be summarised as follows.

Firstly, it does not allow homogeneous use of the surface of an electrolysis cell. Since the electrochemical reaction takes place close to the interface between the electrode and the electrolyte and requires the presence of the gas, electrons and the species involved at the same location, it is easy to supply electrons to the zones under the teeth 10 of the collector, but it is difficult to supply them with gas. The restrictive parameters are permeability of the electrode in contact, its thickness and the width of the tooth 10. Similarly, the zone under the channel 11 is difficult to supply with electrons, since the electrical conductivity of existing electrodes is low. Restrictive parameters are the electric conductivity, and the thickness and width of the channel 11. The inventor believes that the ratio R between the current supply/collection area and the steam supply or produced gas collection area is a parameter that represents real use of the area of the cell. In the case of an interconnection channel plate 1, the ratio R calculated as below is often less than 50%.

$R=1/(1+w/L)$, where w is the width of the channel 11 and L is the width of the tooth 10.

This structure of this plate 1 then involves differentiated production zones with some zones in which production densities and therefore current densities may be very high, for a low average density, and are therefore local sources of performance degradation. This is illustrated locally (at millimetric scale) in FIG. 1B in which very strong current lines are shown located at the ribs 10. Similarly, considering the electrode area, the upstream side current lines are stronger than on the downstream side due to the change in water content in the gas flow between the upstream and downstream parts of the channels.

Similarly, the structure of this plate 1 introduces non-uniformities in the supply of steam to the channels 11 and requires significant over supply of steam (there is a water surplus of more than 100% of the water consumed) to assure a stable and uniform supply for all channels 11, which makes it difficult to achieve a high steam usage rate. Conditioning and pressurisation of this steam have a non-negligible impact on the energy consumption associated with the electrolyser.

There is also a mechanical risk of bending of a cell if there is a large geometric offset between the teeth of an interconnecting plate 1 on the anode side and the teeth of a plate on the cathode side, or if there are any planeness defects of the teeth that could punch and crack the cell. To prevent this risk, very high precision in the relative assembly of the plates on each side of the cell and very high tooth manufacturing quality are necessary.

Furthermore, at the anode side, the channel structure with an inlet and outlet is only useful when a draining gas is used to carry away the oxygen produced to the outlet. Conditioning of this draining gas also has a significant energy cost.

Finally, this plate structure requires a large thickness of material for the collection zone of the produced gases and shaping (machining), that can be prohibitive. Thin plates and stamping can be used but this limits manufacturing possibilities for the unit tooth width and the pitch between teeth. Consequently, the inventor considers that only a limited reduction in the non-uniformity of electrical currents supplied to each cell can be obtained with such an interconnecting channel plate 1.

Another interconnecting plate 1' has already been disclosed [1]. It is shown in FIG. 2 with the fluid circulation represented by the arrows: its structure is of the inter-digitised type. It does not solve the problem of mechanical bending mentioned for plate 1 and it can cause hydraulic tearing of the electrode with which it is in contact.

The applicant has disclosed a new architecture with more homogeneous operation in the international patent application deposited under number PCT/EP2011/053728, to at least partly eliminate the disadvantages of existing interconnecting plates at the cathode of a device for high temperature electrolysis of water that have just been described.

Thus, this application discloses a device for high temperature electrolysis of water comprising:
  at least one elementary electrolysis cell formed by a cathode, an anode and an electrolyte inserted between the cathode and the anode,
  a first device forming an electrical and fluid interconnector comprising a metal part delimited by at least one plane P1, said metal part comprising two internal chambers superposed on each other and a plurality of holes distributed on the surface, approximately perpendicular to the plane and divided into two groups, of which one group of holes opens up both onto the plane P1 and directly into the adjacent chamber, and the other group of holes opens up both onto the plane P1 and into the furthest chamber through channels, the plane P1 of the first interconnector being in mechanical contact with the plane of the cathode.

Part of such a cathodic compartment through which steam is supplied is thus composed of one of the two chambers and a group of holes. The other group of holes and the other chamber form another part of the cathodic compartment through which hydrogen produced at the cathode is recovered.

With such a device, the disadvantages of the traditional architecture of the interconnecting channel plate according to the state of the art as presented above are eliminated.

In other words, unlike HTE electrolyser architectures according to the state of the art presented above, a device according to the application PCT/EP2011/053728 makes it possible to achieve a uniform production density per electrolysis cell and a better steam usage (conversion) ratio.

Due to the plurality of holes opening up onto the plane of the cathode, firstly the entire surface of the cell is available to have a uniform electrical behaviour at all points with a limited electric contact resistance between the cathode and the first interconnector. In other words, the distribution of current at the cathode is optimal.

Similarly, due to the superposition of the chambers and the plurality of holes, steam can be injected directly and uniformly at all points in the cathode through a group of holes, which unlike the state of the art presented above, limits the concentration overvoltage.

Still in this application PCT/EP2011/053728, it is judiciously planned to combine the first interconnector to the cathode with a second interconnector to the anode also comprising a metal part delimited by at least one plane P2, said metal part comprising an internal chamber and a plurality of holes distributed on the surface, approximately perpendicular to the plane P2 and opening up onto it and into the chamber, the plane P2 of the second interconnector being in mechanical contact with the plane of the anode.

Thus, according to this application PCT/EP2011/053728, an electrolyser (HTE) with a stack of elementary electrolysis cells each formed by a cathode, an anode and electrolyte inserted between the cathode and the anode is defined, in which an interconnecting module comprising a first and a second interconnector is arranged between two adjacent elementary cells, such that the plane P1 of the first interconnector is in mechanical contact with the cathode of one of the two elementary cells and the plane P2 of the second interconnector is in mechanical contact with the anode of the other of the two elementary cells.

It has been envisaged that each interconnecting module could be made by assembling solid metallic plates and welding tubes to make fluid communication channels between the first interconnector and the cathode, to either supply steam in contact with the cathode plane P1 from the top chamber or to recover hydrogen produced at the cathode to the top chamber, in other words the chamber superposed on the chamber adjacent to the cathode plane.

The disadvantages of such an embodiment can be summarised as follows:
  high cost of the metallic raw material,
  complexity of assemblies to be made, particularly a large number of welds, with a high cost of the necessary machining,
  non-negligible weight.

Therefore, the purpose of the invention is to disclose a solution to make all or some of an interconnecting module according to the application mentioned above PCT/EP2011/053728 without the above-mentioned disadvantages.

PRESENTATION OF THE INVENTION

To achieve this, the purpose of the invention is a device forming an electrical and fluid interconnector for water hydrolysis at high temperature comprising a metallic part delimited by at least one plane P1, said metallic part comprising two internal chambers superposed one on the other relative to said plane P1 and a plurality of holes distributed on the surface, approximately perpendicular to the plane and divided into two groups, of which a first group of holes opens up both onto the plane P1 and directly into the chamber adjacent to the plane P1 and a second group of holes opens up both onto the plane P1 and into the furthest chamber through channels, the plane P1 of the interconnector being designed to come into mechanical contact with the plane of a cathode of an elementary electrolysis cell formed by a cathode, an anode and an electrolyte inserted between the cathode and the anode.

According to the invention, the metallic part comprises two partly stamped plates, the first of the two plates being perforated on its plane part so as to form the first group of holes and in its stamped parts so as to form a second group of holes, each stamped part of the two plates being perforated and made to form a truncated cone, the stamped parts of the first plate having shapes complementary to the shapes of the stamped parts of the second plate, said first and second plates being assembled to each other by mutual nesting of the stamped parts defining channels, the space delimited by the unstamped parts of the first and the second plates defining the chamber adjacent to the plane P1.

The invention eliminates the disadvantages of an assembly of solid plates by welding of tubes.

For the purposes of the invention, fluid and electrical interconnector means a connection system for the supply or collection of current and for the supply and collection of a fluid to an electrode in an electrolysis cell. Thus, an electrolysis device according to the invention may comprise a single electrolysis cell with a first interconnector in contact with its cathode and a second interconnector described below in contact with its anode. Similarly, as described below, in a stack of electrolysis cells according to the invention, an interconnecting module may comprise a first interconnector in contact with the cathode of an elementary electrolysis cell and a second interconnector in contact with the anode of the adjacent electrolysis cell.

According to one embodiment, the metallic part comprises a third plate also partly stamped and welded to the second plate, the stamped parts of the third plate not being perforated and being in contact with the second plate to increase the stiffness of said interconnector and to enable the passage of electrical current, the space delimited by the unstamped parts of the second and third plates defining the chamber superposed on the chamber adjacent to the plane P1.

The first plate is preferably made from a plane plate using a punching step followed by a stamping step.

Also preferably, the second plate is made from a plane plate using a stamping step followed by an embossing step.

According to one variant embodiment, the chamber adjacent to the plane P1 forms the chamber through which steam is supplied and the superposed chamber forms the chamber in which hydrogen produced by electrolysis is collected.

The invention also relates to an interconnecting module comprising a first interconnector like that described above, and a second electric and fluid interconnector comprising a metal part delimited by at least one plane P2, said metallic part comprising an internal chamber and a plurality of holes distributed on the surface, approximately perpendicular to the plane P2 and opening up onto this plane P2 and also into the chamber, in which the metallic part of the second interconnector comprises two plates called the fourth and fifth plates respectively, the fourth plate being plane and defining plane P2 and through which holes distributed on the surface are perforated, while the fifth plate is partly stamped and welded to the fourth plate, the stamped parts of the fifth plate not being perforated and bearing in contact with the fourth plate to increase the stiffness of said second interconnector and to enable electrical current to pass, the space delimited by the fourth plate which is plane and the unstamped parts of the fifth plate defining the chamber onto which the plurality of holes in the second interconnector open up, in which the third and fifth plates are welded to each other defining the interconnecting module.

Advantageously, the third and fifth plates have the same shape as each other and are preferably identical (same shape, same dimensions, same constituent material).

Preferably, the third and fifth plates are welded back to back, with their stamped parts individually facing each other, to stiffen the entire module and also to enable electrical current to pass from the first plate to the fifth plate.

All plates are advantageously welded by laser transparency.

The invention also relates to a device for high temperature electrolysis of water comprising:
  a stack of elementary electrolysis cells each formed by a cathode, an anode and an electrolyte inserted between the cathode and the anode, and
  a plurality of interconnecting modules described as above, each interconnecting module being arranged between two adjacent elementary cells such that the plane P1 of the first interconnector is in mechanical contact with the cathode of one of the two elementary cells and the plane P2 of the second interconnector is in mechanical contact with the anode of the other of the two elementary cells in plane P2 of the second interconnector.

Finally, the invention relates to a hydrogen production assembly comprising a plurality of electrolysis devices as mentioned above.

BRIEF DESCRIPTION OF THE DRAWINGS

Other advantages and characteristics will become clearer after reading the detailed description given below with reference to the figures among which.

DETAILED PRESENTATION OF PARTICULAR EMBODIMENTS

The interconnecting plates 1, 1' of HTE electrolysers according to the state of the art and shown in FIGS. 1, 1A, 1B and 2 have been commented upon in detail in the preamble. Therefore they are not described below.

The symbols and arrows showing steam, hydrogen and oxygen paths are shown in all figures for reasons of clarity.

High temperature electrolysis according to the invention can be done at temperatures of at least 450° C., typically between 700° C. and 1000° C.

Figure 1:
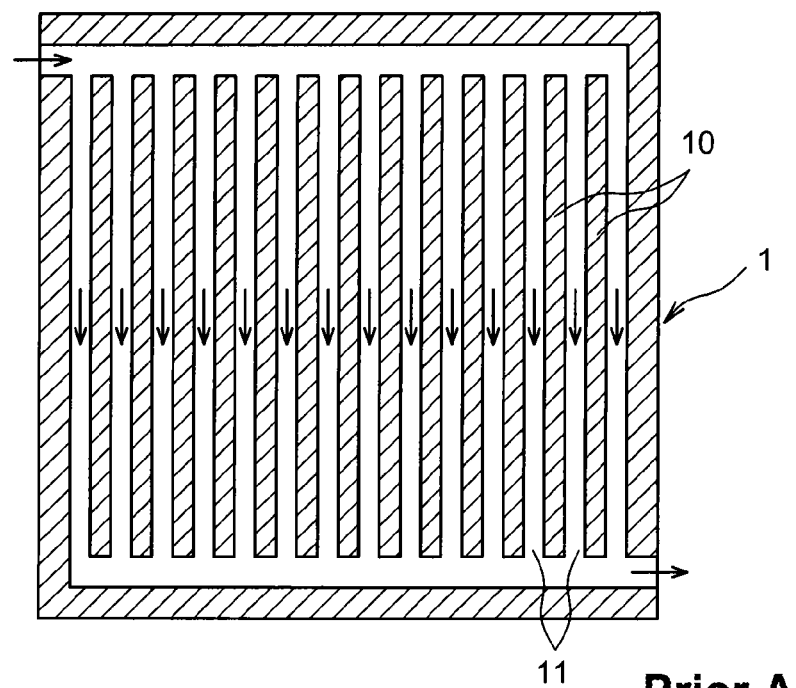
FIG. 1 is a diagrammatic front view of an interconnecting plate of an HTE electrolyser according to the state of the art.
Figure 1A:
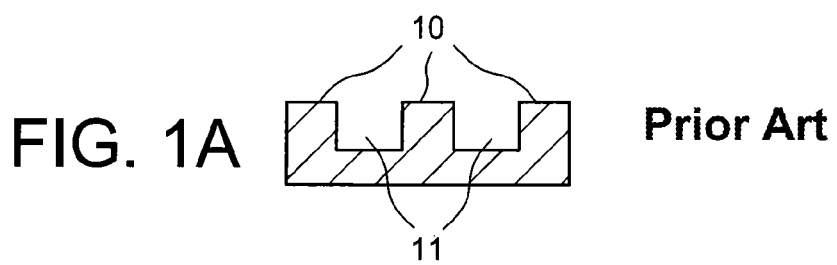
FIG. 1A is a detailed sectional view of an interconnecting plate according to FIG. 1.
Figure 1B:
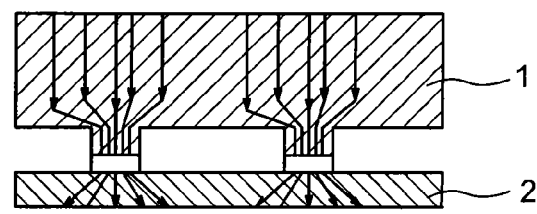
FIG. 1B is a view similar to FIG. 1A showing current lines passing through the plate.
Figure 2:
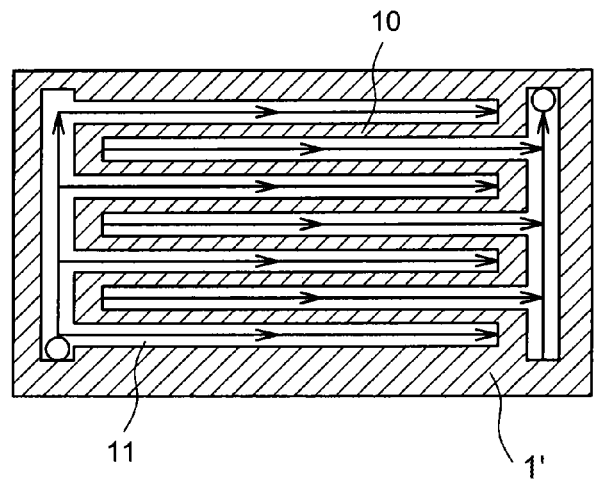
FIG. 2 is a diagrammatic front view of another interconnecting plate of an electrolyser according to the state of the art.
Figure 3:
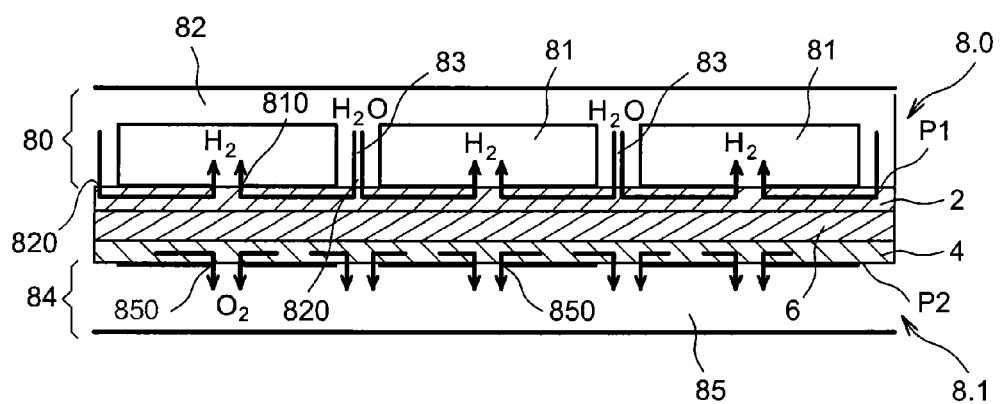
FIG. 3 is a diagrammatic sectional view of an electrolysis device according to patent application PCT/EP2011/053728 with a single electrolysis cell.
Figure 4:
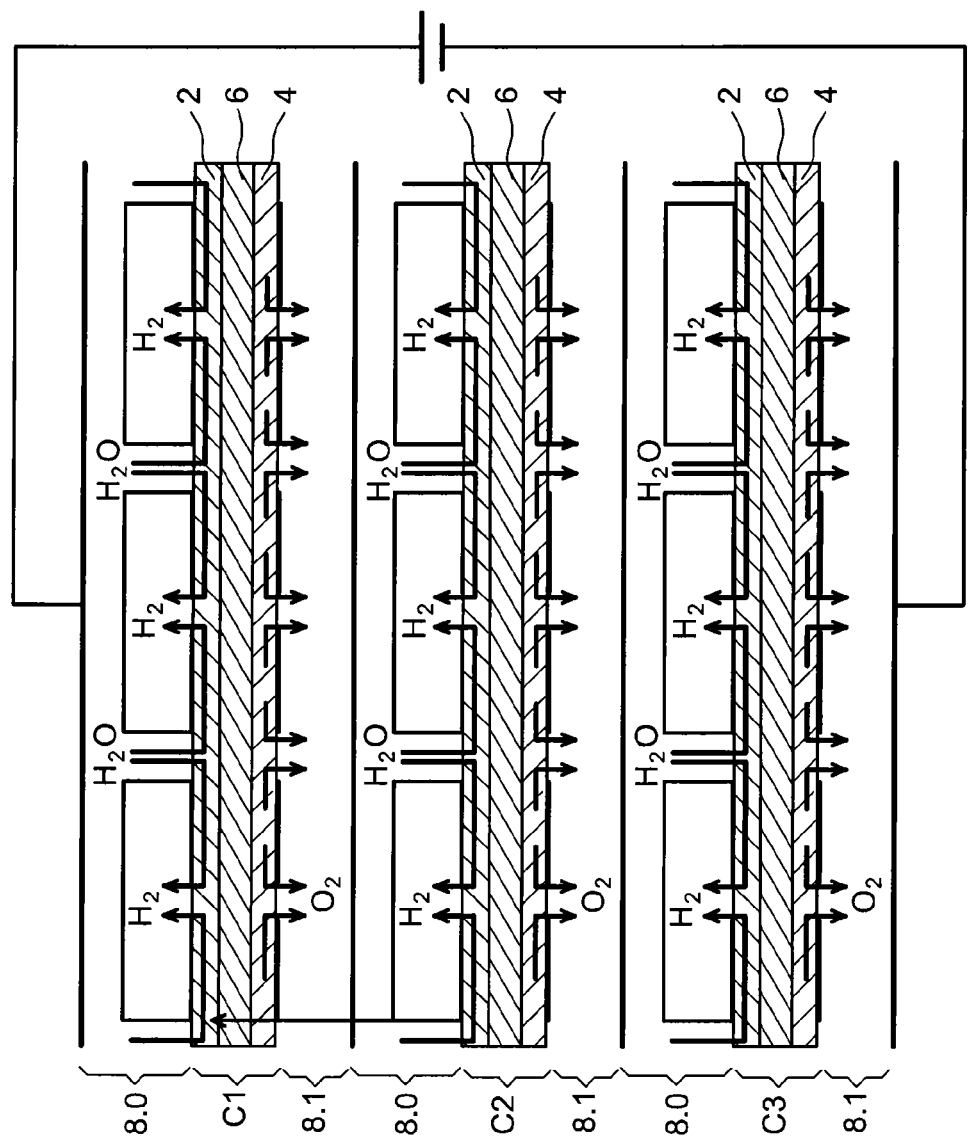
FIG. 4 is a diagrammatic sectional view of an electrolysis device according to the above mentioned patent application PCT/EP2011/053728 with a stack of electrolysis cells.

As shown in FIGS. 3 and 4, an electrolysis device according to the above-mentioned patent application PCT/EP2011/053728 comprises an elementary electrolysis cell formed by a cathode 2, an anode 4 and an electrolyte 6 inserted between the cathode and the anode.

Typically, the characteristics of an elementary electrolysis cell suitable for the invention can be as shown in the table below:

| Electrolysis cell | Unit | Value |
| --- | --- | --- |
| Cathode 2 | | |
| Constituent material | | Ni—YZS |
| Thickness | µm | 315 |
| Thermal conductivity | $W\,m^{-1}\,K^{-1}$ | 13.1 |
| Electrical conductivity | $\Omega^{-1}\,m^{-1}$ | $10^5$ |
| Porosity | | 0.37 |
| Permeability | $m^2$ | $10^{-13}$ |
| Tortuosity | | 4 |
| Current density | $A\,m^{-2}$ | 5300 |
| Anode 3 | | |
| Constituent material | | LSM |
| Thickness | µm | 20 |
| Thermal conductivity | $W\,m^{-1}\,K^{-1}$ | 9.6 |
| Electrical conductivity | $\Omega^{-1}\,m^{-1}$ | $1\,10^4$ |
| Porosity | | 0.37 |
| Permeability | $m^2$ | $10^{-13}$ |
| Tortuosity | | 3.0 |
| Current density | $A\,m^{-2}$ | 2000 |
| Electrolyte 4 | | |
| Constituent material | | YSZ |
| Thickness | µm | 15 |
| Resistivity | $\Omega\,m$ | 0.42 |

A first device 8.0 forming an electrical and fluid interconnector comprises a metallic part 80 delimited by at least one plane P1 in contact with a cathode 2.

The metallic part 80 comprises two internal chambers 81, 82 superposed on each other and a plurality of holes 810, 820 approximately perpendicular to the plane P1 and divided into two groups. A hole perpendicular to the plane P1 means a hole with an axis perpendicular to the plane P1. Therefore its surface is parallel to the plane P1.

One of the groups of holes 810 opens up both onto the plane P1 and directly in the adjacent chamber 81 and the other group of holes 820 opens up both onto the plane P1 and in the chamber 82 furthest away through the channels 83.

The plane P1 of the first interconnector 8.0 is in mechanical contact with the plane of the cathode 2.

As shown in FIG. 3, steam is injected directly through the chamber 82 furthest from the plane P1 in order to achieve the electrolysis reaction.

As shown by the arrow and symbols $H_2$ and $H_2O$ in FIG. 3, steam injected through this chamber 82 then circulates through the channels 83, and is then progressively transformed into hydrogen in the pores of the cathode 2 and due to the uniform supply of electrical current over the entire surface of the cell through the interconnector 8.0.

Some hydrogen is drawn off uniformly through each of the holes 810 in the other group and is then evacuated through the chamber 81 onto which the holes 810 open up.

The electrolysis device according to the patent application PCT/EP2011/053728 mentioned above as shown in FIG. 3 comprises a second interconnector 8.1 on the side of the anode 4.

This interconnector 8.1 also comprises a metallic part 84 delimited by a plane P2 in direct mechanical contact with the plane of the anode 4.

The metallic part 84 comprises an internal chamber 85 and a plurality of holes 850 distributed over the surface, approximately perpendicular to the plane and opening up onto this plane P2 and also in the chamber 85.

As shown using the arrow and the symbol $O_2$ in FIG. 3, oxygen produced at the anode 4 is collected through each of the holes 850 and is then evacuated through the chamber 85.

Figure 6:
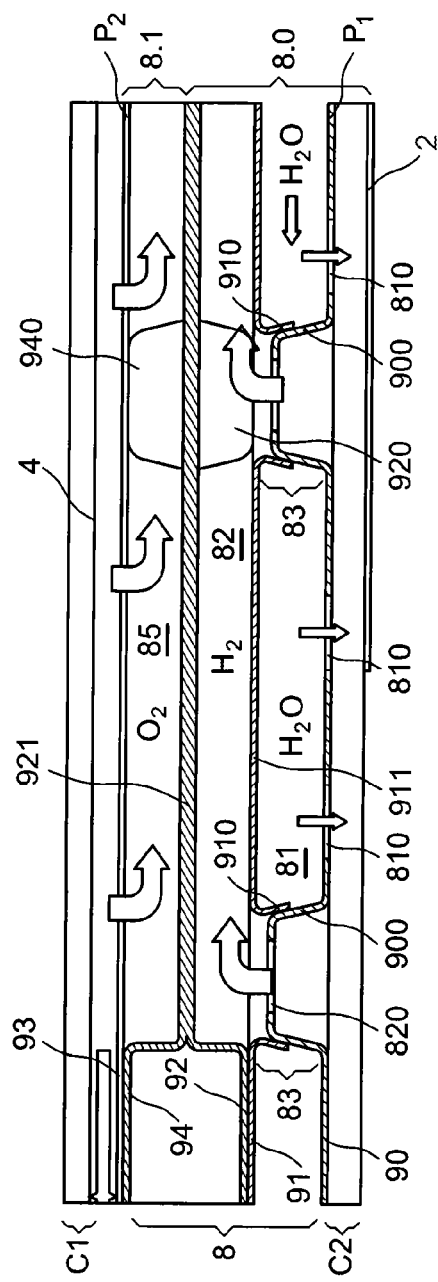
FIG. 6 is a partial cross-sectional view of an electrolysis device according to the above-mentioned patent application PCT/EP2011/053728 with a stack of electrolysis cells and made according to the invention.

FIG. 6 diagrammatically shows a stack of three electrolysis cells C1, C2, C3 with interconnectors according to the above-mentioned patent application PCT/EP2011/053728.

More precisely, current is supplied to and is recovered at the stack terminals composed firstly of a first interconnecting device 8.0 in contact with the cathode of the cell C1 and secondly through a second interconnecting device 8.1 in contact with the cell C3.

An interconnecting module 8 composed of a second interconnector 8.1 and a first interconnector 8.0 is arranged between cell C1 and cell C2, the second interconnector 8.1 being in contact with plane P2 of the anode of cell C1 and the first interconnector 8.0 being in contact with plane P1 of the cathode of the adjacent cell C2.

The arrangement between the adjacent two cells C2 and C3 is the same.

The metallic part 84 forming the second interconnector 8.1 is in direct mechanical contact with the anode 4, as shown in FIG. 3.

The plane P2 of this second interconnector 8.1 is in direct mechanical contact with the plane of the anode as shown in FIG. 3.

In this embodiment, the holes 850 to collect the oxygen produced are aligned alternately and staggered in exactly the same way as the set of holes 810, 820 supplying steam and collecting oxygen respectively.

The stack electrolyser (HTE) that has just been described can work perfectly at a high pressure, typically at a pressure of 30 bars.

The inventors envisaged the following arrangement for each first interconnector 8.0 or second interconnector 8.1:

assemble solid metallic plates, in other words plates manufactured from a blank, weld tubes to two solid plates to make the channels 83, the function of which is either to supply high temperature steam to a cathode 2 from the top chamber 82 as shown in FIGS. 3 and 4, or to recover hydrogen H2 produced at the cathode 2 to bring it into the top chamber as described below.

This solution is unacceptable because it is complex, particularly including complicated machining and many welds particularly for the tubes, and it is expensive and has a non-negligible total weight.

Figure 5:
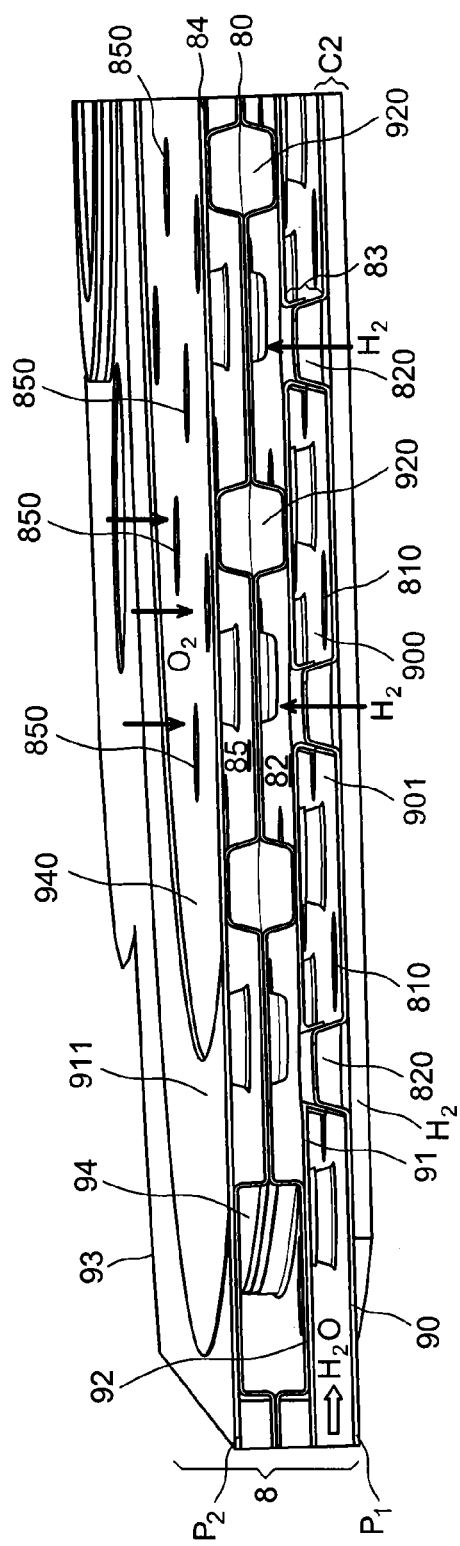
FIG. 5 is a partial perspective view of an electrolysis device according to the above-mentioned patent application PCT/EP2011/053728 with a stack of electrolysis cells and made according to the invention.

Also, with the invention, an interconnecting module 8 is provided between two adjacent electrolysis cells as shown in FIGS. 5 and 6 and made only from thin stamped metal plates perforated and assembled together with a minimum number of welds.

Note that unlike the embodiment shown in FIGS. 3 and 4 according to which the top chamber 82 is the chamber through which steam is supplied and the chamber 81 adjacent to the cathode plane is the chamber in which the hydrogen produced is recovered, the embodiment according to the invention and FIGS. 5 and 6 includes a steam supply through the chamber 81, i.e. adjacent to the cathode plane 2 of a cell, and the hydrogen produced is recovered by the top chamber 82, i.e. the chamber superposed on chamber 81.

Thus with this embodiment in FIGS. 5 and 6, it is thus possible to supply high temperature and high pressure steam from the inside of a sealed envelope adapted to contain steam comprising not more than 1% hydrogen and in which the stack of electrolysis cells is located as described and claimed in patent application PCT/EP2011/053723 in the name of the applicant. Typically, the high temperature high pressure steam is supplied from the periphery of the interconnector 8.0 into the chamber adjacent to the cathode plane as shown by the horizontal arrows in FIGS. 5 and 6.

According to the invention, it is planned that the metallic part 80 should be made from two partly stamped plates 90, 91, and a third plate 92 also partly stamped, to avoid a complex assembly and the time necessary when using welded tubes.

The first 90 of the two plates is perforated in its plane part so as to form a first group of holes 810 opening up onto the plane P1 and in its stamped parts so as to form a second group of holes 820.

Figure 6A:
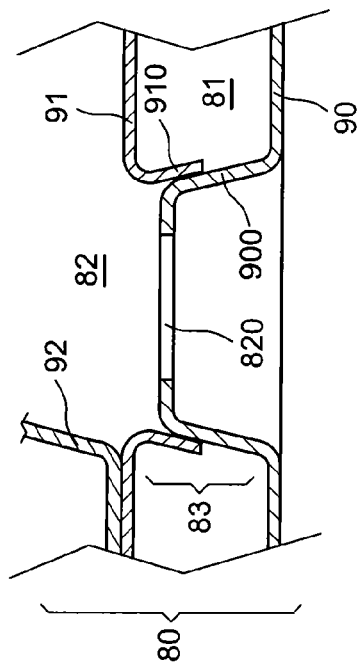
FIG. 6A is a detailed view of FIG. 6.

As shown more clearly in FIG. 6A, each stamped part 900, 910 of the two plates 90, 91 is perforated and shaped in the form of a truncated cone. The shapes of the stamped and perforated parts 900, 910 in the form of a truncated cone of the first plate 90 are complementary to the shapes of the stamped parts of the second plate 91.

The first plate 90 and the second plate 91 are assembled together by mutual nesting of the perforated and stamped plates 900, 910 shaped in the form of a truncated cone.

The channels 83 formed by the inside of the stamped parts 900, 910 and opening up through the holes 820 are the channels through which hydrogen produced passes that is then directed to the chamber 82 superposed on the chamber 81.

The space delimited by the unstamped parts 901, 910 of the first and second and therefore plane plates, defines the chamber 81 adjacent to the plane P1.

The first plate 90 can be obtained starting from the plane plate 901 and performing a punching step to create the two groups of holes 810, 820 followed by a stamping step to form the truncated cones 900.

The second plate 91 can be obtained starting from the plane plate 911 and performing a material stamping step to form a cylinder and then performing an embossing step to form the truncated cones 910.

Assembly by nesting between truncated cones 900 and 910 according to the invention can also be referred to as a "cone-cone" connection, and results in a substantial saving in production time, and is simpler than a solution in which tubes are welded to two solid plates.

This assembly between truncated cones 900, 910 according to the invention guarantees that the necessary seal between the supply of steam $H_2O$ and the produced and recovered hydrogen $H_2$ is achieved when compression forces are applied to the stack of electrolysis cells to achieve good electrical contact between the different elements. Thus, there is no reason to make a weld between the first plate 90 and the second plate 91. In other words, the metal/metal nested assembly of the truncated cones 900 and 910 is uniform and the sealed connection is made by squeezing the truncated cones 900 and 910. In other words, the assembly of the truncated cones 900, 910 according to the invention enables lower cost recovery of hydrogen that is leaktight against the steam supply.

The third plate 92 of the metal part 80 according to the invention is also partly stamped and welded to the second plate 91.

The stamped parts 920 of the third plate 92 are not perforated and bear in contact with the second plate 91 to stiffen said interconnector 8.0 and to enable the passage of an electrical current, or in other words, electrical continuity through the stack of the HTE electrolyser according to the invention.

The space delimited by the non-stamped parts 911, 921 of the second 91 and the third 92 plates define the chamber 82 superposed on the chamber 81 adjacent to the plane P1.

The metallic part 84 of the second interconnector 8.1 is made from two plates 93, 94 called the fourth and the fifth plates respectively.

The fourth plate 93 is plane and defines the plane P2. It is thus perforated with holes 850 distributed on the surface.

The fifth plate 94 is partly stamped and welded to the fourth plate 93. The stamped parts 940 of the fifth plate are not perforated and bear in contact with the fourth plate 93 to stiffen said second interconnector and to enable the passage of an electrical current.

The space delimited by the plane fourth plate 93 and the unstamped parts 941 of the fourth and fifth plates 94 defines the chamber 85 into which a plurality of holes 850 of the second interconnector open up.

The third 92 and fifth 94 plates are welded together and thus define the interconnecting module 8.

As can be seen in FIG. 5, the third 92 and fifth 94 plates are identical and are welded back to back. Their respective stamped parts 920, 940 thus face each other individually to increase the stiffness of the entire module and also to enable the passage of an electrical current from the first plate to the fifth plate. In other words, this can give an interconnecting module 8 capable of resisting compression forces applied to the stack of electrolysis cells and to assure electrical continuity through all interconnecting modules and therefore through the entire stack of cells during operation of the HTE electrolyser at high temperatures.

There may be few welds between plates 91, 92, 94, 93 made during manufacturing, when the high temperature electrolyser is not functioning. Preferably, the welds are made using a transparency laser technique which is possible because the plates are very thin, typically of the order of 0.2 mm.

All plates 91, 92, 94, 93 are advantageously made of 20% chromium ferritic steel, preferably Inconel® 600 or Haynes® 230 or F18TNb type of nickel-based CROFER® 22APU with thicknesses typically between 0.1 and 1 mm.

The interconnecting module 8 according to the invention that has just been described has several advantages:

- a guaranteed good seal: the first and second plates in cone-to-cone assembly give a good quality seal, even if they are thin (typically of the order of 2/10 mm),
- good compactness: the thin plates can achieve shallow stamping typically with a total individual height of less than 1 mm,
- simpler construction than a solution of welded add-on tubes to create steam supply channels or to retrieve the hydrogen produced. This results in a simpler industrial fabrication process by stamping/punching with a smaller total number of welds,
- lower production cost; although a high initial investment may be necessary for a stamping tool, the production of a large series of plates by stamping will eventually have the advantage of reducing fabrication price.

REFERENCE MENTIONED

[1]: Xiango Li, International Journal of hydrogen Energy 30 (2005) 359-371.

The invention claimed is:

1. A device forming an electrical and fluid interconnector for water electrolysis at high temperature, comprising:
    a metallic part delimited by at least one first plane, the metallic part comprising two internal chambers, superposed one on the other relative to the first plane, and a plurality of holes distributed on a surface, a direction through a central axis of each of the plurality of holes being approximately perpendicular to the plane and divided into two groups, of which a first group of holes opens up both onto the first plane and directly into a first chamber of the two chambers that is adjacent to the first plane and a second group of holes opens up both onto the first plane and into a second chamber of the two chambers through channels, the first plane of the interconnector configured to come into mechanical contact with a plane of a cathode of a first elementary electrolysis cell formed by the cathode, an anode, and an electrolyte inserted between the cathode and the anode,
    in which the metallic part further comprises first and second partly stamped plates, the first plate being perforated on an unstamped part of the first plate to form the first group of holes and in stamped parts of the first plate to form the second group of holes, the second plate including an unstamped part and stamped parts, each stamped part of the two plates being made to form a truncated cone, the stamped parts of the first plate having shapes complementary to shapes of the stamped parts of the second plate, the first and second plates being assembled to each other by mutual nesting of the stamped parts defining the channels, a space delimited by the unstamped parts of the first and the second plates defining the first chamber adjacent to the first plane, the unstamped part of the first plate defining the first plane.

2. The device forming an electrical and fluid interconnector for water electrolysis at high temperature according to claim 1, in which the metallic part comprises a third plate, also partly stamped and welded to the second plate, the stamped parts of the third plate not being perforated and being in contact with the second plate to increase stiffness of the interconnector and to enable passage of electrical current, a space delimited by the unstamped parts of the second and third plates defining the second chamber.

3. The device forming an electrical and fluid interconnector for water electrolysis at high temperature according to claim 1, in which the first plate is made from a plane plate using a punching followed by a stamping.

4. The device forming an electrical and fluid interconnector for water electrolysis at high temperature according to claim 1, in which the second plate is made from a plane plate using a stamping followed by an embossing.

5. The device forming an electrical and fluid interconnector for water electrolysis at high temperature according to claim 1, in which the first chamber forms a chamber through which steam is supplied and the second chamber forms a chamber in which hydrogen produced by electrolysis is collected.

6. An interconnecting module comprising:
a first interconnector according to claim 2; and
a second electric and fluid interconnector comprising a metal part delimited by at least one second plane, the metallic part comprising a third internal chamber and a plurality of holes distributed on a surface, a direction through a central axis of each of the plurality of holes being approximately perpendicular to the second plane and opening up onto this second plane and also into the third chamber,
in which the metallic part of the second interconnector comprises fourth and fifth plates respectively, the fourth plate being plane and defining the second plane and through which holes distributed on the surface are perforated, while the fifth plate is partly stamped and welded to the fourth plate, the stamped parts of the fifth plate not being perforated and bearing in contact with the fourth plate to increase stiffness of the second interconnector and to enable electrical current to pass, a space delimited by the fourth plate which is plane and the unstamped parts of the fifth plate defining the third chamber onto which the plurality of holes in the second interconnector open up,
in which the third and fifth plates are welded to each other defining the interconnecting module.

7. The interconnecting module according to claim 6, in which the third and fifth plates have a same shape as each other.

8. The interconnecting module according to claim 6, in which the third and fifth plates are welded back to back, with their stamped parts individually facing each other to stiffen an entire module and also to enable electrical current to pass from the first plate to the fifth plate.

9. The interconnecting module according to claim 6, in which all plates are welded by laser transparency.

10. A device for high temperature electrolysis of water comprising:
the interconnecting module according to claim 6;
the first elementary electrolysis cell; and
a second elementary electrolysis cell formed by a cathode, an anode, and an electrolyte inserted between the cathode and the anode, the first elementary electrolysis cell being adjacent to the second elementary electrolysis cell;
wherein the interconnecting module is arranged between the first elementary cell and the second elementary electrolysis cell such that the first plane of the first interconnector is in mechanical contact with the cathode of the first elementary electrolysis cell and the second plane of the second interconnector is in mechanical contact with the anode of the second elementary electrolysis cell.

11. A hydrogen production assembly comprising a plurality of electrolysis devices according to claim 10.

* * * * *